Oct. 19, 1937.    G. M. BELLANCA    2,096,535
RETRACTABLE LANDING GEAR
Original Filed May 17, 1933    3 Sheets-Sheet 1
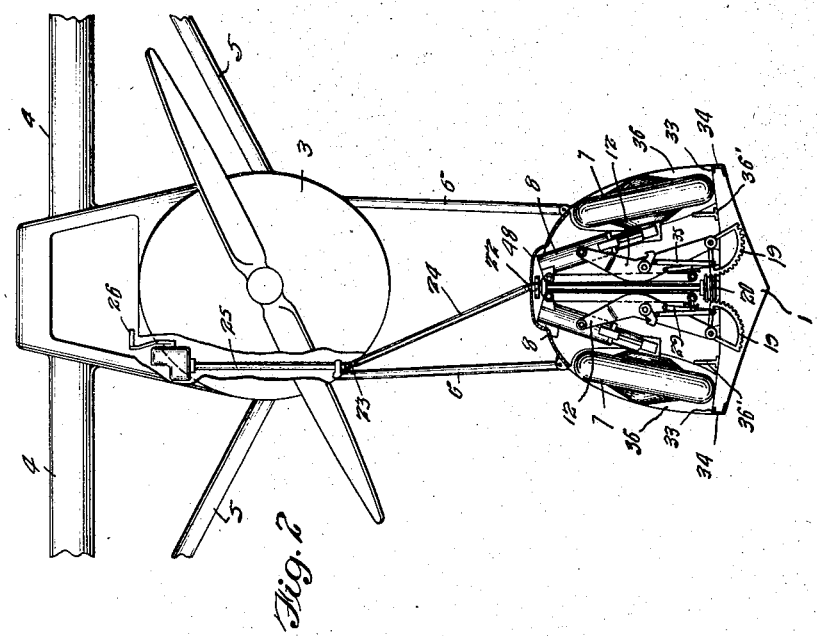
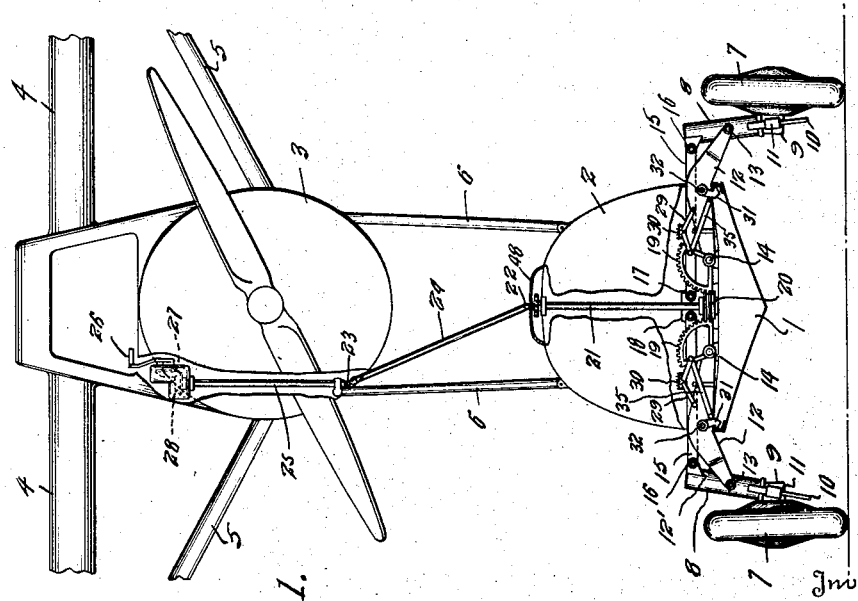
Inventor
Giuseppe M. Bellanca
By Semmes & Semmes
Attorneys

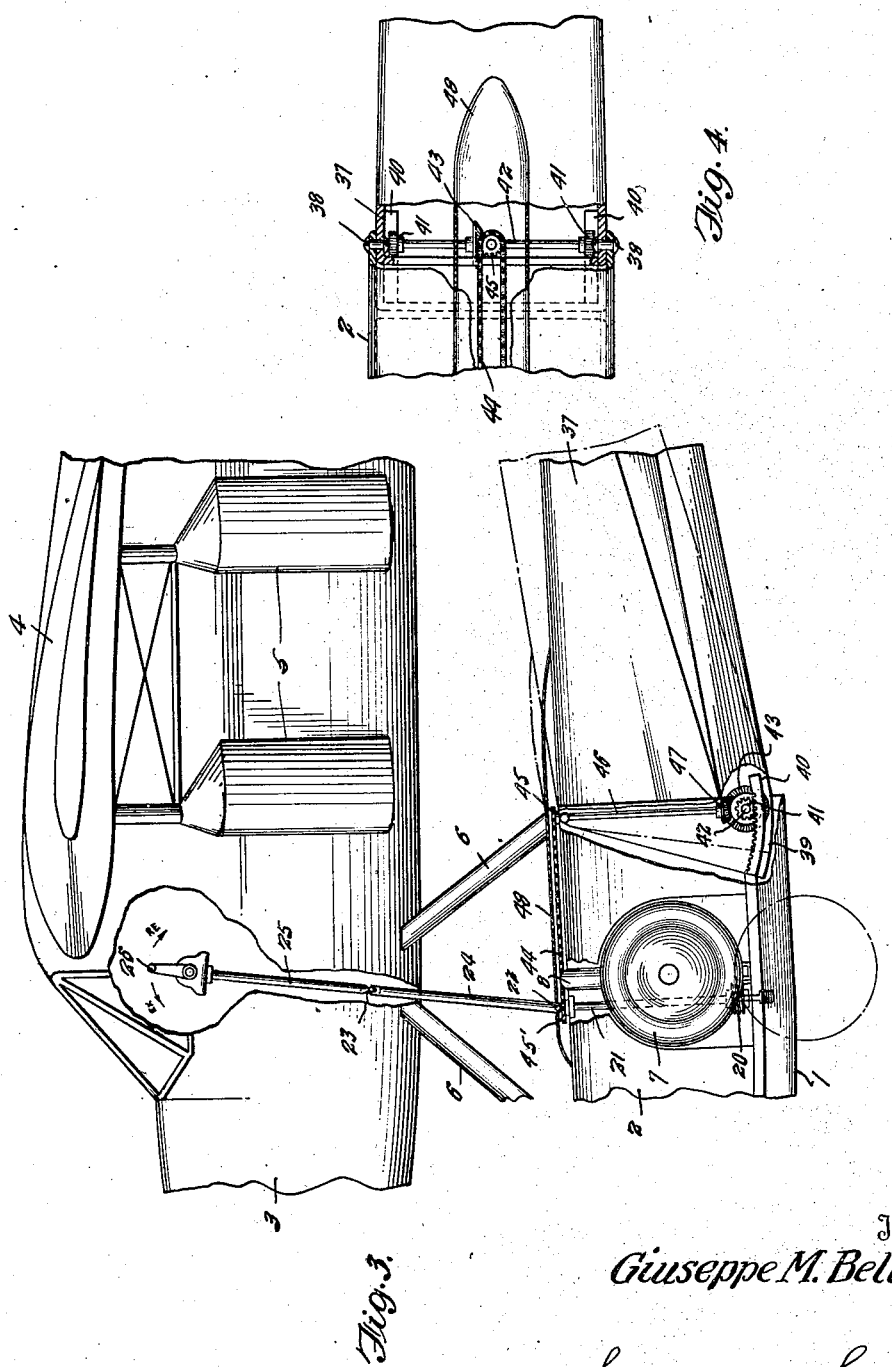

Oct. 19, 1937.   G. M. BELLANCA   2,096,535
RETRACTABLE LANDING GEAR
Original Filed May 17, 1933   3 Sheets-Sheet 3
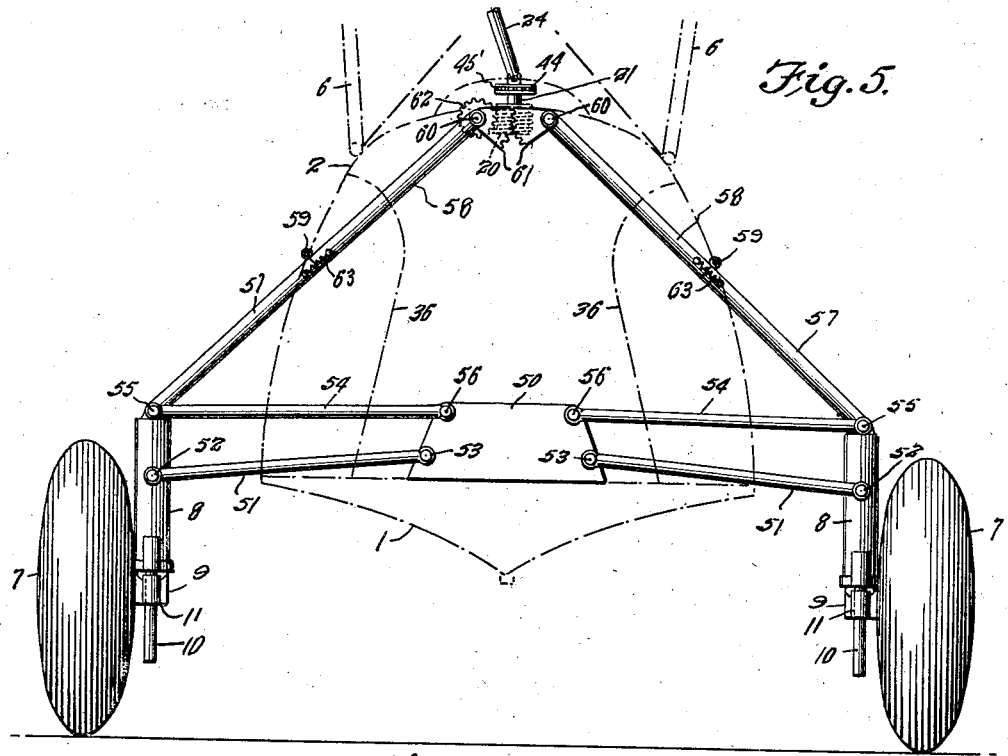
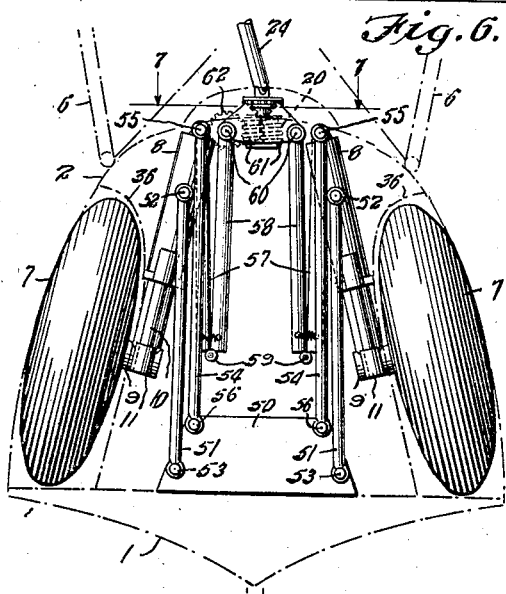
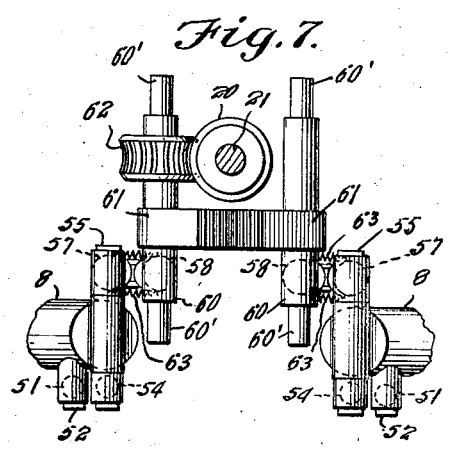
Inventor
Giuseppe M. Bellanca
By Semmes & Semmes
Attorneys Patented Oct. 19, 1937

2,096,535

UNITED STATES PATENT OFFICE 2,096,535

RETRACTABLE LANDING GEAR

Giuseppe M. Bellanca, New Castle, Del.

Application May 17, 1933, Serial No. 671,564
Renewed March 2, 1937

7 Claims. (Cl. 244—2)

This invention relates to airplanes, and more particularly to an improved type of airplane landing gear.

The advantages of retractable landing gear have been recognized. It is a freely admitted fact, however, that the known structures are not positive and sure in operation. Instances of such structures failing to operate constantly recur. The difficulties of providing an efficient retractable landing gear are somewhat aggravated in amphibian planes. Due to the relatively great length of the float it is necessary either to secure a two-point landing or to extend the landing gear mechanism some considerable distance below the float.

An object of the present invention, therefore, is to provide an improved retractable landing gear.

Another object is to provide a novel float for seaplanes.

A still further object of the invention is to provide a new type of retractable landing mechanism for amphibian planes.

With these and other equally important objects in view the invention comprehends the concept of providing a landing gear which is maintained in substantially the vertical plane both in extended and retracted position, and the operating mechanism of which is composed of rugged inflexible members. The invention also includes provision of a special float, the rear or stern portion of which has a permissive vertical movement, which vertical movement may be effected simultaneously with the movement of the landing gear.

In order to more clearly explain the invention physical embodiments are shown, for purpose of illustration, in the accompanying drawings, in which:

Figure 1 is a special detail view showing a retractable mechanism in extended or landing position.

Fig. 2 is a view similar to Fig. 1 showing the mechanism in retracted position.

Fig. 3 is a side elevation, with parts in section, of an airplane equipped with the novel float and landing gear.

Fig. 4 is a plan detail of the float structure.

Fig. 5 is an elevation of a modified form of the invention.

Fig. 6 is a similar view showing the landing gear in retracted position.

Fig. 7 is a view taken on line 7—7 of Fig. 6.

As shown in the drawings, the novel landing gear, designated generally by the numeral 1, is preferably, although not necessarily, associated with an improved float structure 2.

The float is associated with any conventional or desired type of plane having, for example, a fuselage 3, main sustenation surfaces 4 and lift struts 5. The float may be attached to the fuselage proper in any desired manner known to those skilled in the art, as for example by means of the plural struts 6.

The landing gear proper comprises the stream line wheels 7 and the oleo assembly 8. The oleo assembly is complete in itself and comprises two telescopic members, the lower one of which is connected to the wheel through the wheel axle. The oleo unit may comprise a spring and oil system providing for a total wheel travel of approximately six or more inches.

Also associated with the oleo unit is a tube member 10 which is adapted to slide or reciprocate within the guide block 11. The tube and guide are positioned forwardly of the axis of the stub axle to prevent torsional movement of the wheel with respect to the oleo unit. As clearly shown in Fig. 2, the upper end of the tube is securely fastened to the oleo cylinder and the lower tubular portion slides in the guide block 11. A pair of such guide units, one positioned forwardly and one positioned rearwardly of each stub axle, may be employed.

The retracting mechanism for the landing wheels provides a modified parallel linkage arrangement which not only provides for retraction while maintaining the wheel in a substantially vertical position, but also presents a rugged load taking unit. This mechanism is duplicated for each wheel, as shown, and is operated from a single shaft, which comprises the lower beam members 12 pivoted at one end to an intermediate point on the upper cylinder of the oleo, at 13, and at the other end to the bearing shaft 14. Two such beams or links are provided for each wheel and are spaced several inches apart. These two wheel beams are pivoted respectively to the forward face of the oleo cylinder as shown and to the rearward face (not shown). The beams are constructed of a suitable high strength metal or alloy and are of slightly curved shape formed with a deep web. To accommodate the diameter of the oleo the beam may be offset as shown at 12'.

The upper member of the parallel linkage comprises the straight link 15 pivoted at one end, 16, to an upper section of the oleo cylinder and at the other end 17 to a solid rigid section of the float, as shown at 18.

It will be observed that the point 18 is closer to the longitudinal axis or keel line of the float than the point 17 and hence when the wheel 7 is elevated or retracted it will be moved upwardly and laterally to a position within the contour of the float structure, as shown in Fig. 2. The parallel linkage is associated with mechanism by which it may be moved to its operative positions. There are a number of specific mechanisms for accomplishing this, that shown in the drawings being illustrative of a positively acting type. The actuating mechanism comprises the sector gears 19 mounted for rotation on the bearing shafts 14. These two gears mesh with the single worm 20 which is keyed to the shaft 21. The shaft 21 is connected, through suitable flexible couplings 22 and 23 and shaft sections 24 and 25, to any suitable source of power. This is shown for convenience as the hand crank 26, and the intermeshing gears 27 and 28 are secured respectively to the crank and shaft 25. Manifestly other means of rotating the shaft 21 and other specific forms of transmission members may be employed. Thus, if desired, power for rotating the worm 20 may be taken off from the power plant of the plane or may be developed by a separate motor. Similarly other specific forms of transmission members may be employed.

The sector gears are interconnected with the parallel linkage so as to transmit movement to them. In the preferred embodiment this connection comprises a hinged strut 29. This strut is pivoted at one end to the beam member 12 and at the other end to the sector gear. Associated with the strut at its central hinge point or pivot is a spring 30 which acts to resiliently maintain the two sections of the strut in alignment, as shown in Fig. 2. It is to be observed that the points of pivotal connection of the hinged strut to the beam 12, on the one end, and to the sector gear on the other, lie above the bearing shaft 14; hence rotative movement of the sector will tend to raise or lower the landing wheel, depending upon the direction of rotation of the gear.

As noted hereinbefore, the lower beam member 12 is solidly constructed so as to serve as a load taking member. At or near its mid-point the beam 12 is provided with a latch or hook 31 which is pivoted on the beam by the pivot 32. This latch is formed with a detent or hook-like portion which is adapted to positively engage a rigid portion of the float, when the landing wheel is extended in its operative position. This may be done by providing flanges 33 upon the ribs 34 or other solid structural members of the float.

The sector gear and the latch 31 are also interconnected so that movement of the sector will cause the latch to positively engage in its cooperating flange to lock the linkage against vertical movement. As shown, this is accomplished by pivotally connecting the strut member 35 to each the sector gear and the latch.

Mounted upon the float and positioned immediately below the hinge point of each of the struts 29 are the vertical posts 36'.

From this description of the parts the operation of the device will be appreciated. Assuming the landing gear to be in its extended position, i. e. in the position of the parts shown in Fig. 1, it is desired to retract the landing gear. The crank 26 is operated in the direction shown in Fig. 2. Motion is transmitted through the linkage 25—24—21 to the worm wheel 20. Rotation of the worm wheel causes a corresponding rotation of the intermeshed sector gears 19. Now it is to be noted that in the structure shown in Fig. 1 the strut 29 is broken and the latch 31 positively engages its locking flange. The parts are so designed that during initial rotation of the sector gear the links 35 are retracted, towards the center of the float, and the latches therefore disengage the locking flanges. At the same time the hinge struts tend to straighten out and further movement of the sector gears causes these, under the action of the spring 30, to assume the full straightened position and to be locked in this position. Further rotation of the sector gears, therefore, will impose a direct pull on the beam 12, through the now straightened strut 29, and cause this beam to rotate about the bearing shaft 14. It is to be here noted that the application of force from the sector gear to the beam 12 is above the bearing point 14. With continued rotation of the worm gear, beams 12 and 15 swing about their respective pivots and the wheel 7 eventually is retracted within the recess 36 provided in the sides of the float. In the preferred form of the invention twenty-seven inch streamline wheels are employed because it has been found that this assembly fairs into the side of the float better than any other type. As shown in Fig. 2, when the sector gears have been rotated to their extreme limit the wheels and oleos are housed completely within the contour of the float and in the vertical position. Any suitable type of temporary locking means may be employed for keeping the mechanism in the retracted position.

When it is desired to extend the gear the crank is rotated in the opposite direction, as indicated in Fig. 3. In these circumstances motion is transmitted through the worm gear to the sector gears and thence to the struts 29, which now act as rigid members, pushing the landing gear outwardly and downwardly. This movement continues until the linkage members 12 and 15 are substantially in a horizontal position. The vertical posts 36 are so designed that as the gear approaches the bottom of its travel the hinged struts 29 contact, at their hinge points, with the posts 36. In these circumstances the struts 29 "break". Further rotation of the sector gear, therefore, is not substantially resisted by the broken strut and such motion is imparted directly to the latch 31 through the intermediate link 35. Sufficient rotation of the sector gear at this point, therefore, will cause the latch positively to engage its flange. This extension and locking can be done with considerable force in view of the utilization of the worm and sector drive. A suitable indicator (not shown) is provided to indicate to the pilot the location of the gear and the position of the locks.

The mechanical principles involved in the construction shown in Figs. 1 and 2 may be incorporated in other and specifically different embodiments, such for example as is shown in Fig. 6. In this structure the mechanical movements are comparable to those of the structure in Figs. 1 and 2 and the same beneficial results are secured. As shown in Fig. 5, the principles of the invention may be embodied in a landing gear mounted upon the float 1. The wheel structure, including the oleo, may be precisely the same as that shown in the first modification and similar reference numerals on this structure are applied. A base plate 50 may be rigidly secured to a structural part or parts of the pontoon and positioned within any predetermined section of it. A link 51 is pivoted at 52 to an intermediate portion of the oleo and at its other end is pivoted at 53 to the base plate. A second and longer link 54 is similarly pivoted at 55 at or near the top of the oleo and pivotally mounted at its other end 56 on the base plate.

It will be seen that in function the link 51 corresponds to the beam 12 of the structure in Fig. 1 and the link 54 similarly corresponds functionally to the link 15 in Fig. 1. Likewise it will be noted that the pivotal point 56 of the link 54 is positioned inboard or inwardly of the pivotal connection 53. This likewise corresponds to the lateral displacement of the pivotal points 14 and 17 in Fig. 1. Hence the modified parallel linkage arrangement in Fig. 5 is the functional equivalent of the similar mechanism in Fig. 1.

The wheel structure illustrated in Figs. 5 and 6 is adapted to be elevated in a general vertical plane and then moved laterally to a housed position within the depressions 36. In order to accomplish this movement the link members 57 and 58 are provided. Link 57 is pivoted to the oleo structure on the pivot 55, as shown in Fig. 7, and is connected at its other end through the hinge 59 to the link 58. Link 58 is keyed or otherwise rigidly secured to the stub shaft 60 which is adapted to be rotated through suitable means.

The preferred form of accomplishing this is shown in Fig. 7. As there shown, each of the shafts 60 is provided with sector gears 61 which are keyed or otherwise rigidly secured to the shafts so as to be rotated thereby. As will be noted in Fig. 7, the ends of the shafts 60 are provided with reduced journal portions 60' for association with suitable bearings. One of the shafts 60 is provided with a worm wheel 62 which is in constant mesh with the worm 20. This latter, as has already been described, is attached to the shaft 21 and is adapted to be rotated through the linkage 24—25 from the cockpit.

From the description given it will be appreciated that the link units 57 and 58 operate in effect as toggles. When the parts are in the position shown in Fig. 5, that is to say when the landing gear is in full extended position, the link sections 57 and 58 are in alignment and constitute a continuous compression strut. The members are maintained in this aligned position by means of the springs 63 which, it will be noted, are offset from the hinge point 59. In this position of the parts when the plane is taxiing, the running stresses are dispersed through the linkage system 52—54, 57—58, during which time the links 57—58 act under compression. To sustain these stresses, as shown in the drawings, the links 57—58 are made quite rugged. The links 57—58 are maintained in the extended position not only by action of the spring 63 but also by reason of the positive lock afforded by the intermeshed gear operating units. As shown in Fig. 7, preferably a spring 63 is provided on each side of the links 57—58.

When it is desired to retract the landing gear, as during flying or alighting on the water, the crank 26 is turned. This transmits motion to the units 25—24 and thence through the intermeshed gears 20 and 62. Rotation of the worm 62 imparts corresponding rotation to each of the shafts 60 by reason of the intermeshing relationship of the sector gears 61. During retraction the shafts 60 rotate. The force applied to the transmission linkage acts to overcome the tension of the springs 63 and break the linkage 57—58 at the hinge pin 59. Further rotation of the shafts 60 effects the elevation of the oleo wheel due to the effective shortening of the linkage 57—58.

Due to the offset relationship of the pivots 53 and 56 the wheel and oleo are elevated and then moved laterally to their housed position as shown in Fig. 6. When the gear is fully retracted it may be locked in this position by means of suitable locking mechanism in the cockpit.

It will be appreciated that inasmuch as the landing gear is extended and retracted by means of a positively connected linkage throughout, the danger of operative failure is practically eliminated. Furthermore this positive connection of the operative mechanism insures a positive locking of the parts in the extended position.

As intimated hereinbefore difficulties have been experienced in the landing of amphibian planes upon land. These planes are provided with relatively long pontoons or floats and in many circumstances the rearward or stern portions of these floats have struck the ground during landing, causing no inconsiderable damage. In most types of planes, as is known to those skilled in the art, the float is positioned somewhat considerably below the tail portion of the fuselage.

In accordance with the present invention this difficulty is obviated by providing the float with a retractable stern portion. In the preferred form of the invention this stern portion may be retracted simultaneously with the extension of the landing gear so as to more nearly convert the amphibian into a land plane, for purposes of landing upon the ground.

As shown particularly in Figs. 3 and 4, the rear or stern portion 37 of the float is mounted so as to have a permissive swinging movement, in a vertical plane, with respect to the remainder of the float. This may be done in divers manners, such for example as pivoting the section 37 on the section 2 by means of a pivot joint 38. The forward bottom portion of the section 37 is curved upwardly, as shown at 39, so as to permit this movement. It will be understood that the gap between the section 39 and the bottom of the main float section 2 is closed off with some suitable form of flexible water-proof material.

The stern section 37 may be caused to move upwardly and downwardly by any suitable mechanism, a typical form of which is shown in the drawings. The bottom portion of the float section 37 may be provided with racks 40, preferably positioned near the side of the float with which mesh the pinions 41. These pinions may be keyed to the shaft 42 upon which is mounted the bevel gear 43. In order to insure simultaneous movement of the landing wheels and the rear end of the pontoon, motion may be taken off from the crank 26 for the two operations. The simple method of doing this is shown in Fig. 3. The shaft 21 is provided near its upper end with the sprocket 45' with which meshes the chain 44. The chain 44 passes over a second sprocket 45 fixed on the vertical shaft 46. The lower end of this shaft carries a bevel gear 47 which is in mesh with the bevel gear 43. This mechanism is simple in form and serves to illustrate the principles of the invention.

It will be seen that as the shaft 21 is rotated to lower the landing wheels this movement is transmitted to the pinion gear 41 through the chain and bevel drive to elevate the rear end of the float to the position shown in dotted line in Fig. 3. In order to simplify the drawings no bearing member for the shafts 42 and 46 have been shown, but it will be understood that such shaft is provided with suitable journals or bearings to maintain them in their fixed operative position. Rotation of the shaft 23 in the opposite direction to retract the landing wheels will simultaneously depress the tail portion 37 to a position in alignment with the forward end of the float.

The operative mechanism on the float is suitably protected by means of the flexible covering 48. This may be any suitable flexible material, such as canvas, rubberized cloth and the like.

With this type of structure when it is desired to ground the plane the crank 26 is operated in the direction shown by the arrow (Ex) and in the manner described the landing wheels are extended and the rear end of the float elevated simultaneously. This has the effect of shortening the float and allowing the tail skid on the fuselage to take the landing shocks rather than the rear portion of the float.

It will now be appreciated that the described type of landing gear is eminently positive in operation and of improved structural characteristics. The landing load from the stub axle is resiliently transmitted through the sliding lower joint of the oleo to the upper oleo cylinder and thence to the parallel linkage bracing mechanism. The lower rugged beams of the linkage transmit shear from the landing gear to the float structure through the latches and inner bearings, thus distributing this stress. As pointed out, torsion at the axle, in the plane of the oleo, is transmitted to the upper oleo cylinder by means of the sliding guide tube arrangement, bridging the joint between the two telescopic sections of the oleo, and thence to the float structure in the same manner as the bending forces. The upper member of the parallel linkage acts substantially as a separate compression and tension link and carries the axial loads in resisting the couple due to side loads.

With this type of structure, therefore, it will be seen that numerous advantages accrue. The positively acting single control system operates not only to lock the parts but also to retract the assemblage. Due to the relatively small overhang, the weight of the unit is reduced to a minimum. In view of the special mounting the travel of the wheel is substantially vertical, thus insuring improved taxiing qualities. It is particularly to be noted that the provision of the worm drive insures the development of considerable force in extending and retracting the mechanism; thus in the event that ice or other obstructions form in the locked sockets, sufficient pressure can be generated by means of the worm drive to force out such obstructions. With the structure of Fig. 1, in the event that the airplane is landed with the locks disengaged, due to the failure of the pilot to insure their engagement, only parts of the structure would fail. In such circumstances the wheels would rise until the keel of the float engaged the ground. The hinged strut would simply bend up further than normal. In the event the hinged strut was still stiff or aligned at the time of landing, it would fail in compression as it is designed as the weakest member of the unit. This then preserves all of the rest of the mechanism from damage and the gear can quickly be rendered operative by replacing the broken strut.

Therefore, while the preferred embodiment of the invention has been described, it is to be understood that this is given as exemplifying the principles involved and not in a restrictive sense.

I claim:

1. In combination with an airplane a retractable landing gear comprising a landing wheel and an oleo strut therefor, a beam member pivotally connected at one end to the strut and at the other end to a fixed support on the airplane, a linkage connected to the beam, and coacting with the beam to swing it to extend and retract the landing wheel and another linkage coacting with the beam to lock it in the full extended position.

2. In combination with an airplane a retractable landing gear comprising a landing wheel and a supporting strut, a beam member pivotally connected at one end to the strut and at the other end to a fixed support on the airplane, a linkage pivotally connected to the beam, and coacting with the beam to swing it to extend and retract the landing wheel and another linkage coacting with the beam to lock it in the extended position, and a single means for actuating the linkages.

3. The combination of a float, a retractable landing gear comprising a landing wheel provided with an oleo gear, a beam pivotally connected at one end to the oleo and at the other end to the float, a link pivotally connected at one end to the oleo and at the other end to the float structure; a locking mechanism directly connected to the beam, a link connected with the locking mechanism and adapted to move it to locking position, a pair of pivoted links connected to the beam and together forming a breakable strut, and a single actuating means connected to the locking link and to the breakable strut.

4. In combination with a float, a retractable landing gear comprising a landing wheel provided with an oleo gear, a beam pivotally connected at one end to the oleo and at the other end to the float, a link pivotally connected at one end to the oleo and at the other end to the float structure, a locking mechanism directly connected to the beam, a link connected with the locking mechanism and adapted to move it to locking position, a pair of pivotal links connected to the beam and together forming a breakable strut, a single actuating means connected to the locking link and to the breakable strut, and a member subjacent the breakable link and adapted to contact therewith to break the strut at a predetermined position of the gear.

5. In combination with an airplane, a retractable landing gear comprising a landing wheel provided with an oleo strut, a beam member pivotally connected at one end to the oleo and at the other end to a fixed support on the airplane, a compression link pivoted at one end to the upper portion of the oleo and at its other end to a fixed support, a linkage pivotally connected to the beam at a point intermediate its ends and coacting with the beam to swing it to extended and retracted position, a second linkage coacting with the beam to lock it in extended position and a single means for actuating the linkages.

6. In combination with an airplane, a retractable landing gear comprising a landing wheel provided with an oleo strut, a beam member pivotally connected at one end to the oleo and at the other end to a fixed support on the airplane, a compression link pivoted at one end to the upper portion of the oleo and at its other end to a fixed support, a linkage pivotally connected to the beam at a point intermediate its ends and coacting with the beam to swing it to extended and retracted position, a second linkage coacting with the beam to lock it in extended position, a sector gear pivotally connected to each said linkages and adapted to actuate the linkages.

7. In combination with an airplane, a retractable landing gear comprising a landing wheel and an oleo strut therefor, a beam member pivotally connected at one end to the strut and at the other end to a fixed support on the airplane, a linkage connected to the beam and coacting with the beam to swing it to extend and retract the landing wheel, another linkage coacting with the beam to lock it in the fully extended position, and a sector gear pivotally connected to each said linkages and adapted to actuate them.

GIUSEPPE M. BELLANCA.